US012046440B2

(12) United States Patent
Bollenbach et al.

(10) Patent No.: US 12,046,440 B2
(45) Date of Patent: Jul. 23, 2024

(54) X-RAY TARGET ASSEMBLY, X-RAY ANODE ASSEMBLY AND X-RAY TUBE APPARATUS

(71) Applicant: COMET AG, Flamatt (CH)

(72) Inventors: Markus Bollenbach, Ostermundigen (CH); Phillipe Koelliker, Gränichen (CH)

(73) Assignee: COMET AG, Flamatt (CH)

( * ) Notice: Subject to any disclaimer, the term of this patent is extended or adjusted under 35 U.S.C. 154(b) by 264 days.

(21) Appl. No.: 17/788,001

(22) PCT Filed: Jan. 8, 2021

(86) PCT No.: PCT/EP2021/050250

§ 371 (c)(1),
(2) Date: Jun. 22, 2022

(87) PCT Pub. No.: WO2021/140187

PCT Pub. Date: Jul. 15, 2021

(65) Prior Publication Data

US 2023/0046211 A1 Feb. 16, 2023

Related U.S. Application Data

(63) Continuation of application No. PCT/EP2019/087101, filed on Dec. 27, 2019.

(51) Int. Cl.
*H01J 35/08* (2006.01)

(52) U.S. Cl.
CPC ......... *H01J 35/08* (2013.01); *H01J 2235/081* (2013.01); *H01J 2235/088* (2013.01)

(58) Field of Classification Search
CPC ................. H01J 35/08; H01J 2235/081; H01J 2235/088; H01J 35/108; H01J 2235/086; H01J 2235/1291; H01J 35/12; H01J 35/112
See application file for complete search history.

(56) References Cited

U.S. PATENT DOCUMENTS

2014/0369471 A1* 12/2014 Ogura .................... H01J 35/116 378/143
2015/0092924 A1* 4/2015 Yun ....................... H01J 35/105 378/143
2018/0005795 A1 1/2018 Robinson et al.

FOREIGN PATENT DOCUMENTS

JP 2002093355 A * 3/2002
JP 2002093355 A 3/2002
JP 2014072157 A 4/2014

OTHER PUBLICATIONS

Translation of JP-2002093355-A (Year: 2002).*
International Search Report (May 11, 2021) for corresponding International App. PCT/EP2019/050250.

* cited by examiner

*Primary Examiner* — David P Porta
*Assistant Examiner* — Mamadou Faye
(74) *Attorney, Agent, or Firm* — WRB-IP PLLC

(57) ABSTRACT

An X-ray target assembly includes a cylindrical base and a cylindrical multilayered X-ray target that includes at least a heat transfer layer, an X-ray source layer and an adhesion layer provided between the heat transfer layer and the X-ray source layer, wherein the X-ray target is oriented such that the heat transfer layer is closest to the base, wherein the X-ray target is placed on top of a cylindrical carrying element, wherein the in-plane coefficient of thermal expansion of each of the heat transfer layer, the X-ray source layer, the adhesion layer and of the material of the carrying element is different, wherein the in-plane coefficient of thermal expansion of the heat transfer layer is the lowest and that of the material of the carrying element the highest.

19 Claims, 3 Drawing Sheets

X-RAY TARGET ASSEMBLY, X-RAY ANODE ASSEMBLY AND X-RAY TUBE APPARATUS

BACKGROUND AND SUMMARY

The present invention relates to the field of X-ray tubes, more particularly to the field of X-ray target assemblies. Specifically, the present invention relates to an X-ray target assembly which allows for its use in high power regime without the risk of deterioration of the X-ray source layer. The present invention relates furthermore to an X-ray anode assembly and an X-ray tube apparatus comprising an X-ray target assembly according to the present invention.

X-ray tubes have many different industrial and medical applications. In particular, they form the essential part of X-ray tube apparatuses that are employed for the medical purpose of patient imaging and technical purpose of inspecting samples. Normally, such apparatuses possess an electron generating part, called the cathode head or cathode assembly, and an X-ray generating part called the anode assembly. At the core of the anode assembly, an X-ray target assembly is provided. The latter comprises an X-ray source layer at which the X-rays are actually created. During operation, the electrons generated at the cathode are accelerated by a high electric field towards the X-ray source layer of the X-ray target assembly onto which they eventually impinge. The loss of kinetic energy of the electrons due to their interaction with the atoms of source layer material results in the generation of X-ray radiation. Depending on the material of the source layer, X-rays with different energies can be generated.

An X-ray tube is nothing else than an energy converter. It receives electrical energy and transforms it in photons, more precisely in X-rays. This energy transformation is unfortunately very inefficient and an X-ray tube transforms the incoming electrical energy mostly in heat. The heat is actually created at the X-ray target assembly, precisely at the X-ray source layer. The heat generated at the anode is an undesirable byproduct and X-ray tubes are designed and constructed to maximize X-ray production and to dissipate the generated heat as rapidly as possible.

As mentioned above, the X-ray target assembly is the component of the X-ray tube at which the X-ray radiation is produced. It is normally a relatively large piece of metal that is positively biased with respect to the cathode in order to accelerate the electrons to a kinetic energy of several thousands of electrons volts.

The X-ray target assembly, respectively the anode assembly, has two main functions: first, it has the function to convert electronic energy into X-rays, and second it needs to dissipate the heat created in the process. The materials out of which the X-ray target assembly is built, are selected to enhance these functions. Of course, the ideal situation would be if most of the electrons created X-ray photons rather than heat. The fraction of the total electronic energy that is converted into X-rays depends mainly on two factors: the atomic number Z of the X-ray source layer and the energy of the electrons. Most X-ray tubes employ tungsten (W), which has an atomic number of 74, as the material for the X-ray source layer. In addition to a high atomic number, tungsten has several other properties such as a high melting point, a relatively low rate of evaporation as well as relatively high thermal conductivity. For many years, pure tungsten was used as X-ray source material. However, in recent years alloys of tungsten have increasingly been used as the target material but only for the source layer of some target assembly. The body of the target assembly supporting the source layer is on many tubes manufactured from a material that is relatively light and has good thermal conductivity, or, in the case of rotating anodes, high heat storage capability. Examples of such materials are copper, molybdenum and graphite.

There are two main types of X-ray target assemblies: the rotating targets and the stationary or fixed targets. Rotating targets are shaped as beveled disks and attached to the shaft of an electric motor that rotates them at relatively high speeds during the X-ray production process. Since the target is rotating, the electrons spot formed on the anode has the form of a long track, i.e. the electron spot is distributed on a larger surface of the target material than in fixed targets. By this means, the heat generated at the target is distributed on the X-ray source layer, which reduces the risk of the deterioration of this layer. Nevertheless, rotating targets have the disadvantages to be complicated to build and to require more space and are therefore more expensive. Rotating targets are especially limited in their cooling capacity by the low heat transfer through the rotation bearings, and their cooling depends on storing the energy in their bulk material and dissipating it by radiative means. Another disadvantage is the difficult mechanical coupling between the rotating anode inside the vacuum and the power unit for the rotation outside the vacuum.

In fixed or stationary target, the electrons hit the source layer always at the same area. In order to avoid material deterioration of the source layer, it is necessary that the target is well cooled such that the heat generated by the electrons is efficiently transported away.

Several designs of fixed X-ray target assemblies are known from the prior art. Such assemblies normally comprise a first layer of X-ray generating material connected to a second body of a thermally conductive material, usually a massive copper body substantially in the form of a cylinder that is actively cooled, for instance by means of fluid or gas cooling. The X-ray source layer, for instance tungsten or a tungsten-alloy, is usually directly deposited, for instance by means of ion sputtering, onto the surface of the copper body or is embedded in the body by a casting process. These assemblies have the advantage to be very simple to build and are very robust. However, the source layer deteriorates rapidly due to the heat generated at the electrons focal spot and this despite the cooling effort of the target body.

In prior art it has been proposed to deposit the X-ray generating material directly onto a layer of diamond, in order to use the high thermal conductivity of crystalline diamond. During fabrication of said target assemblies, the problem of different heat expansions of the different materials making up the assembly arises. The differences in expansion can cause mechanical stresses in the assembly at elevated temperatures, which can lead to various forms of performance and lifetime deterioration. Unfortunately, a rapid deterioration of the target, in the form of cracks in the source layer or in the supporting disk, is also often observed during operation of such targets. As soon as such mechanical deteriorations are observed, the target assembly cannot further be used in a proper manner.

It is therefore a goal of the present invention to propose a novel X-ray target assembly which is optimized to reduce thermomechanical stresses between the different layers of the target assembly during fabrication and operation, so that deterioration of the target layer can be avoided for long periods of time even in high power operation. It is also a goal of the present invention to propose a novel X-ray anode assembly and a novel X-ray tube apparatus comprising an X-ray target assembly according to present invention.

It is desirable to propose a novel X-ray target assembly, thanks to which the above-described drawbacks of the known systems are completely overcome or at least greatly diminished.

It is desirable to propose an X-ray target assembly comprising a cylindrical base and a cylindrical multilayered X-ray target that comprises at least a heat transfer layer, an X-ray source layer and an adhesion layer provided between the heat transfer layer and the X-ray source layer, wherein the X-ray target is oriented such that the heat transfer layer is closest to the base, wherein the X-ray target is placed on top of a cylindrical carrying element, wherein the in-plane coefficient of thermal expansion of each of the heat transfer layer, the X-ray source layer, the adhesion layer and of the material of the carrying element is different, wherein the in-plane coefficient of thermal expansion of the heat transfer layer is the lowest and that of the material of the carrying element the highest, wherein the carrying element featuring a height DH and a diameter DD is attached to the base and positioned between the base and the heat transfer layer, wherein the diameter DD of the carrying element is smaller than the diameter BD of the base, wherein the ratio R of the height DH over the diameter DD of the carrying element is larger than or equal to 0.1 and smaller than or equal to 0.2, and wherein the diameter TD of the X-ray target is substantially equal to the diameter DD of the carrying element.

The inventors have found out that by providing for a carrying element between the base and the X-ray target with a certain dimensions in diameter and height related to the dimensions of the base and X-Ray target, more precisely with a ratio R of height DH over diameter DD of the carrying element larger than or equal to 0.1 and smaller than or equal to 0.2, the mechanical stress in the X-ray target caused by the differences in heat expansion of the different materials used, precisely in the thermal expansion mismatch between the material of the carrying element, the heat transfer layer and the X-ray source layer, can be suppressed or at least greatly diminished. The inventors has found out that this effect is particularly important where the heat expansion of the carrying element material is highest and that of the heat transfer layer is the lowest. Thus, when the assembly is heated overall during operation, the heat transfer layer will be subjected to varying strain and compressive stress by the different dimensional expansions of the target and the carrying element above and below it, respectively. The proposed optimized overall dimensional geometry of the assembly balances the differently oriented forces exhibited onto the heat transfer layer by matching the geometry to the ratios of the heat expansion coefficients of the materials used for target layer, heat transfer layer and carrying element, and thus reducing the cyclic thermomechanical stress on the layered system during operation. Without these measures, high power operation will quickly lead to debonding of the different layers with each other and with the carrying element. This is particularly true where the in-plane coefficient of thermal expansion of the heat transfer layer is at least ten times smaller than the coefficient of thermal expansion of the carrying element. An additional thin adhesion layer made from a highly ductile material additionally improves on the bonding and adhesion properties of the layered and structures system under high thermal loads. By means of an adhesion layer, it is ensured that the X-ray source layer sticks strongly enough to the heat transfer layer. It allows especially for avoiding dewetting of the X-ray source layer that otherwise would lead to the exposition of the heat transfer layer to the electron beam.

With an X-ray target assembly according to the present invention, it is therefore possible to provide for a high-power X-ray target assembly without the risk for a mechanical destruction of the target due to high temperature and high mechanical stress in the assembly.

In a first preferred embodiment of the present invention, the base and the carrying element are coaxial. This is favorable since it allows for a simple construction of the target assembly. It permits in particular that the base and the carrying element are easily built out of one piece of material.

In another preferred embodiment of the present invention, the diameter BD of the base is at least 1.5 time larger than the diameter DD of the carrying element. With a base at least 1.5 larger than the diameter of the carrying element, it is possible to ensure that the cooling efficiency is sufficient to dissipate the heat produced in the X-ray source layer even in case of very high-power applications.

In another preferred embodiment of the present invention, the base and the carrying element are made out of copper, silver or a combination thereof. This allows for a sufficiently high thermal conductivity of the carrying element and the base in order to transport the heat produced at the X-ray source layer in direction of the base, which is, advantageously, actively cooled.

In a further preferred embodiment of the present invention, the heat transfer layer exhibits an in-plane thermal conductivity of at least 500 W/m·K, advantageously of at least 1000 W/m·K. This is advantageous to spread the heat created at the X-ray source layer in the in-plane direction, i.e. in a plane normal to the longitudinal axis of the carrying element.

In yet another preferred embodiment of the present invention, the heat transfer layer is made out of one or more carbon allotropes. By using carbon allotropes as heat transfer layer is possible to provide for heat transfer layer having a sufficiently high thermal conductivity and at the same time a high melting point. By this means, it is possible to employ the X-ray target assembly in regimes where the X-ray source layer is kept at a temperature just below its melting point.

In a further preferred embodiment of the present invention, the heat transfer layer is made out of diamond. Diamond has the advantage of having a high thermal conductivity even at high temperature. This allows for a good heat transfer between the X-ray source layer and the carrying element even when the target assembly is used at high power and with a high meting point material for the X-ray source layer. Diamond has further the advantage that it spreads the heat in directions "in plane". Since the region of the X-ray source layer onto which the electron beam is impinging is small in order to keep the size of the X-ray virtual source small, it is advantageous if the heat produced by the electron beam is spread into the whole heat transfer layer before being transferred to the carrying element. By means of using diamond, the mechanical stress in the whole X-ray target can therefore be minimized.

In another preferred embodiment of the present invention, the heat transfer layer is made out of highly oriented pyrolytic graphite (HOPG). HOPG has the property of having a higher in-plane than out-of-plane thermal conductivity thus allowing for an effective spreading of the heat produced in the X-ray source layer. A heat transfer layer made out of HOPG can conveniently be brazed to the carrying element.

In yet another preferred embodiment of the present invention, the X-ray source layer is made out of tungsten, tantalum, molybdenum or an alloy thereof. By means of using high melting point materials for the X-ray source layer, it is possible provide for an X-ray target assembly that can be used at very high-power regimes.

In another preferred embodiment of the present invention, the X-ray target comprises several heat transfer layers and X-ray source layers in alternation.

In a further preferred embodiment of the present invention, an adhesion layer is present between each heat transfer layer and X-ray source layer. The one or more intermediate adhesion layers ensure that the X-ray source layer will not have a single columnar crystalline structure. The multi columnar crystalline structure ensures a higher mechanical strength under thermal stress.

In yet another preferred embodiment of the present invention, the one or more adhesion layer is made out rhenium, rhodium, molybdenum or chromium. This allows for optimal adhesion of the X-ray source layer to the heat transfer layer. This is especially advantageous in cases where the heat transfer layer is made out of diamond or HOPG.

In a further preferred embodiment of the present invention, the X-ray source layer and/or the adhesion layer is deposited on the heat transfer layer by means of ion beam sputtering, chemically vapor deposition or thermally vapor deposition. This allows for a simple but highly precise fabrication of the X-ray source layer and/or of the adhesion layer.

In another preferred embodiment of the present invention, the base comprises cooling fins on its side opposite to the carrying element. With cooling fins, the effective surface of the portion of the base, which can be brought in contact with cooling means is increased. This allows for a more efficient cooling of the X-ray target assembly.

In yet another preferred embodiment of the present invention, the base comprises a recess in which the carrying element is located. This allows for providing a high enough carrying element without increasing the overall height of the X-ray target assembly.

In another preferred embodiment of the present invention, the recess of the base possesses a depth smaller than half of the height DH of the carrying element. This ensures that the carrying element is protruding in the direction of the imping electrons.

Aspects of the present invention are also directed to an X-ray anode assembly as well as an X-ray tube apparatus comprising an X-ray target assembly according to the present invention. By using an X-ray target assembly according to the present invention, the performances of the X-ray anode assembly respectively of X-ray tube apparatus are improved.

BRIEF DESCRIPTION OF THE DRAWINGS

The foregoing and other objects, features and advantages of the present invention are apparent from the following detailed description taken in combination with the accompanying drawings in which.

DETAILED DESCRIPTION

Figure 1:
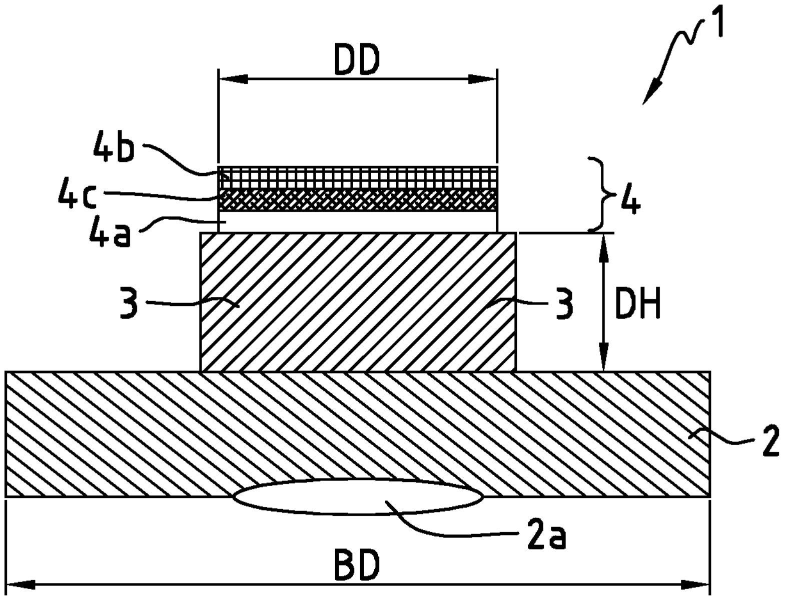
FIG. 1 is a schematic side view of an X-ray target assembly according to a first preferred embodiment of the present invention.

FIG. 1 illustrates a schematic side view of an X-ray target assembly 1 according to a first preferred embodiment of the present invention. The target assembly 1, here a fixed target assembly, comprises a cylindrical base 2, a cylindrical carrying element 3 and a target 4. As illustrated, the target 4 is provided on top of the carrying element 3 and comprises a heat transfer layer 4*a* and an X-ray source layer 4*b*. The heat transfer layer 4*a* has the purpose of supporting the source layer 4*b* and of optimally transferring the heat created in the source layer 4*b* during X-ray production under the effect of an impinging high-energy electron beam.

As the electron beam is focused onto a tiny region of the source layer 4*b*, it is advantageous if the heat transfer layer 4*b* is able to spread the heat in directions substantially perpendicular to the longitudinal axis of the carrying element 3 and the base 2, i.e. "in-plane". With heat spreading, the cooling efficiency of the base 2 and the carrying element 3 is higher than if the heat produced in the source layer 4*b* would be substantially transmitted to the carrying element 3 by the heat transfer layer 4*a* in a direction parallel to the longitudinal axis of the target assembly 1.

The heat transfer layer 4*a* shall not only have a high thermal conductivity in order to transfer the heat produced in the source layer 4*b* but shall also have a high melting point. In order to efficiently produce X-rays at the source layer 4*b*, its temperature shall be kept slightly below its melting point. As in many applications, the use for the source layer 4*b* of high melting point materials such as tungsten or tungsten alloys, rhenium or molybdenum, is required, the heat transfer layer 4*b* shall have a melting point higher than the expected temperature at the interface between the source layer 4*b* and the heat transfer layer 4*a*. Materials that combine the ability to spread the heat in directions other than parallel to the longitudinal axis of the target assembly 1, a high thermal conductivity and high melting point are for examples carbons allotropes and especially diamond or highly oriented pyrolytic graphite (HOPG). For that purpose, diamond can be in the form of chemically vapor deposited (CVD) diamond or crystal diamond. Wherein the latter has better thermal and mechanical properties.

In order to efficiently transport the heat produced in the target 4 away, the base 2 as well as the carrying element 3 are made out of materials with a thermal conductivity of at least 100 W/m·K, advantageously of at least 200 W/m·K, even more advantageously of at least 300 W/m·K. Examples of possible materials are copper, silver or a combination thereof. Important to note is that the base 2 and the carrying element 3 can be made out of the same material or out of two different materials. Furthermore, the base 2 and the carrying element 3 can advantageously be produced from one piece of material. The base 2 and the carrying element 3 are advantageously cylindrical shape and coaxial. Nevertheless, the base 2 and the carrying element 3 could exhibit other sections, such as for example rectangular or squared sections, and they do not need to be coaxial. Furthermore, and as can be observed in FIG. 1, the base 2 comprises cooling means 2*a*, on its face opposite to the carrying element 3. The cooling means can have any kind of shape in order to increase the contact surface to a given fluid or gaseous cooling medium.

As mentioned above, the X-ray source layer 4*b* is provided on top of the heat transfer layer 4*a* as actual source for the X-rays. The source layer 4*b* is made out of the material suitable for the production of X-ray with the desired wavelength respectively energy. Advantageously, the source layer 4*b* of the X-ray target assembly 1 is made out of a high melting point material such as tungsten, a tungsten alloy, for instance tungsten carbide, rhenium or molybdenum. The source layer 4*b* is advantageously deposited onto the heat transfer layer 4*a* by means of ion beam sputtering, CVD or thermal evaporation. The source layer 4*b* shall be thick enough such that all imping electrons decay before reaching the heat transfer layer 4*a*. For electron energy in the range of 100 key a thickness of 2 to 10 microns, especially 2 to 5 microns, depending on the exact material of the source layer 4*b*, is sufficient to completely attenuate the electron beam. Providing for a thicker source layer does not allows for producing any additional X-rays but would diminish the cooling efficiency. This can be especially a problem when the source layer 4*b* is made out of a material with low thermal conductivity such as tungsten or a tungsten alloy.

In order to improve the adhesion properties of the X-ray source layer 4*b* on the heat transfer layer 4*a*, it can be advantageous to provide for an adhesion layer 4*c* between these two layers. The adhesion layer can, for instance, be a layer of 1 to 10 microns, especially 5 to 50 nm, of rhenium, rhodium, chromium or molybdenum. This is especially advantageous in cases where the heat transfer layer 4*a* is made out of diamond since layers deposited on diamond have reduced adhesion in case of several metals.

Figure 2:
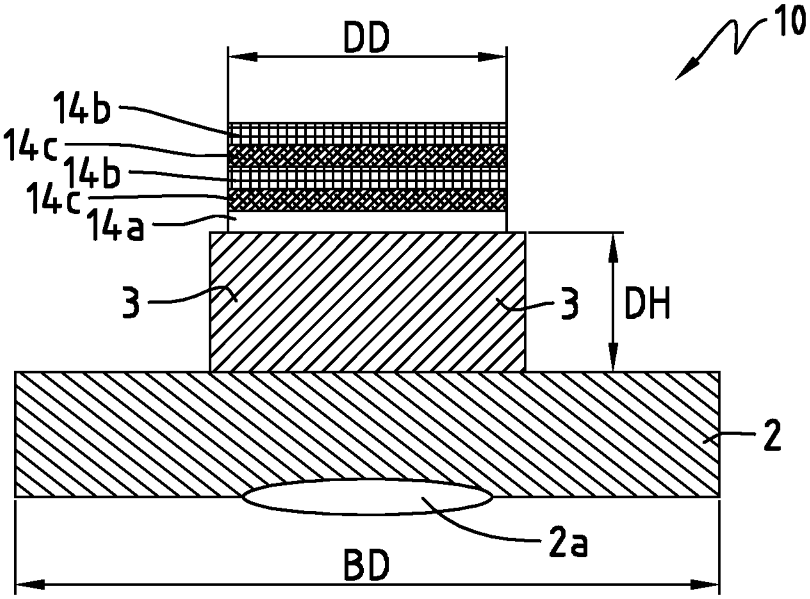
FIG. 2 is a schematic side view of an X-ray target assembly according to a second preferred embodiment of the present invention.

FIG. 2 illustrates a schematic side view of an X-ray target assembly 10 according to a second preferred embodiment of the present invention. As can be seen in this figure, the target 14 comprises a heat transfer layer 14*a* and on top of it several adhesion layers 14*c* and source layers 14*a* in alternation. The presence of intermediate adhesion layers ensure that the X-ray source layer will not have a single columnar crystalline structure. The multi columnar crystalline structure ensures a higher mechanical strength under thermal stress. Apart from the presence of additional layers in the target 14, the target assembly 10 is similar to target assembly 1. Especially, the target 14 is placed on top of carrying element 3 and base 2 and the target assembly comprises cooling means 2*a* on the face of the base 2 opposite to the carrying element 3.

Figure 3:
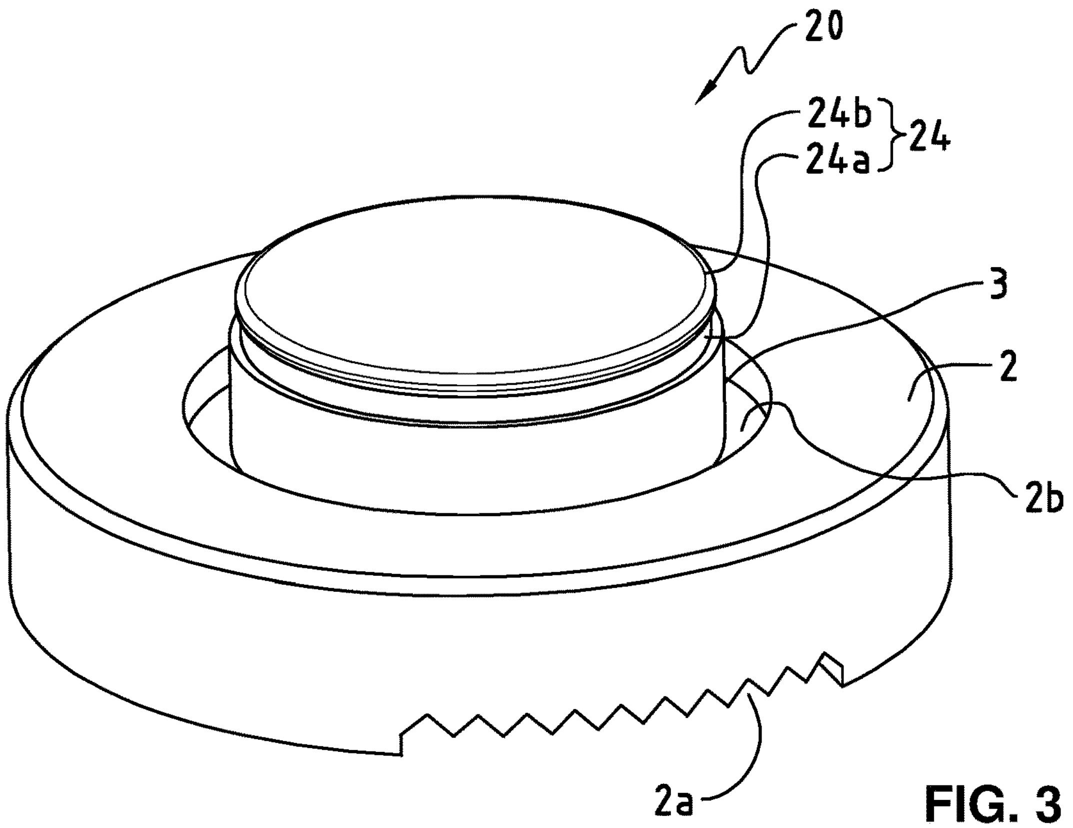
FIG. 3 is a perspective view of an X-ray target assembly according to a third preferred embodiment of the present.
Figure 4:
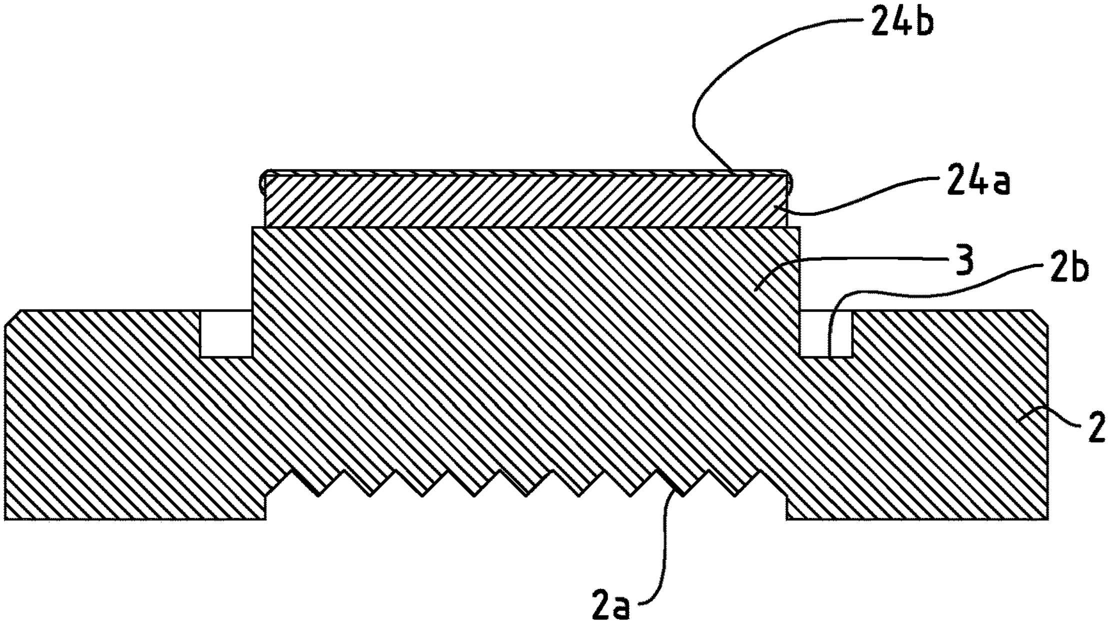
FIG. 4 is a schematic side view of an X-ray target assembly according to the third preferred embodiment of the present.

FIG. 3 illustrates a perspective view of an X-ray target assembly 20 according to a third preferred embodiment of the present invention. The target assembly 20, comprises a cylindrical base 2, a cylindrical carrying element 3 and a target 24. As can be seen in this figure, the base 2 comprises a base recess 2*b* in which the carrying element 3 is located. The presence of the base recess 2*b* implies that the upper edge of the base is higher than the lower edge of the carrying element. The base recess 2*b* has the advantage of allowing for a target assembly with a reduced overall height. A skilled person would however understand that the presence of the base recess 2*b* is not an essential feature of the present invention and that an X-ray target assembly according to the present invention can be foreseen without a base recess 2*b*. A sectional side view of the target assembly 20 according to the third preferred embodiment of the present invention is shown in FIG. 4. As illustrated, the base 2 of the target assembly 20 comprises, on its face opposite to the carrying element 3, cooling means in the form of cooling fins 2*a*. Of course, cooling means in the form of cooling fins could be used in all embodiments of the target assemblies according to the present invention. The target 24 of the target assembly 20 comprises, similar to target 4 and 14, a source layer 24*b* and a heat transfer layer 24*a*. An adhesion layer 24*c* can be provided between these two layers.

As can be seen in FIGS. 1 to 4, the targets 4, 14, 24 of the target assembly 1, 10, 20 are, contrary to X-target assemblies known from the prior art, not directly provided on or embedded into the base 2, but are placed on top of a carrying element 3. The inventors have observed that, by providing for a carrying element 3 of substantially the same diameter as the target between the base 2 and the target, the mechanical stress in the heat transfer layer and the source layer due to different thermal expansion coefficient can be reduced. Thanks to the carrying element 3 the material below the heat transfer layer can freely expand without producing irremediable mechanical stress in the target and partly cancel the stress caused by the heat expansion in the source layer relative to the heat transfer layer. The presence of carrying element 3 especially inhibits the usually observed mechanical cracking of the target at high power regime, i.e. when the X-ray source layer is almost at its melting point.

It has been observed that the value of the ratio R between the height DH of the carrying element 3 and its diameter DD has an important impact on the mechanical and thermal properties of the target assemblies according to the present invention. Advantageously, the height DH is larger by at least 10% than DD but smaller than 20% of DD, or mathematically expressed: $0.1 \cdot DD < DH < 0.2\ DD$. This implies, for example, that for a carrying element diameter DD of 5 mm, the carrying element height DH shall be in the range 0.5 mm to 1 mm. For DD=8 mm, DH shall be in the range 0.8 mm to 1.6 mm and for DD=10 mm, DH shall be in the range 1 mm to 2 mm. Of course, the diameter TD of the target 4, precisely of the heat transfer layer 4*a* and the X-ray source layer 4*b*, is substantially equal to the diameter DD of the carrying element 3. Furthermore, in order to obtain optimal cooling efficiency, the diameter BD of the base shall be at least 1.5 time larger than the diameter DD of the carrying element 3.

Figure 5:
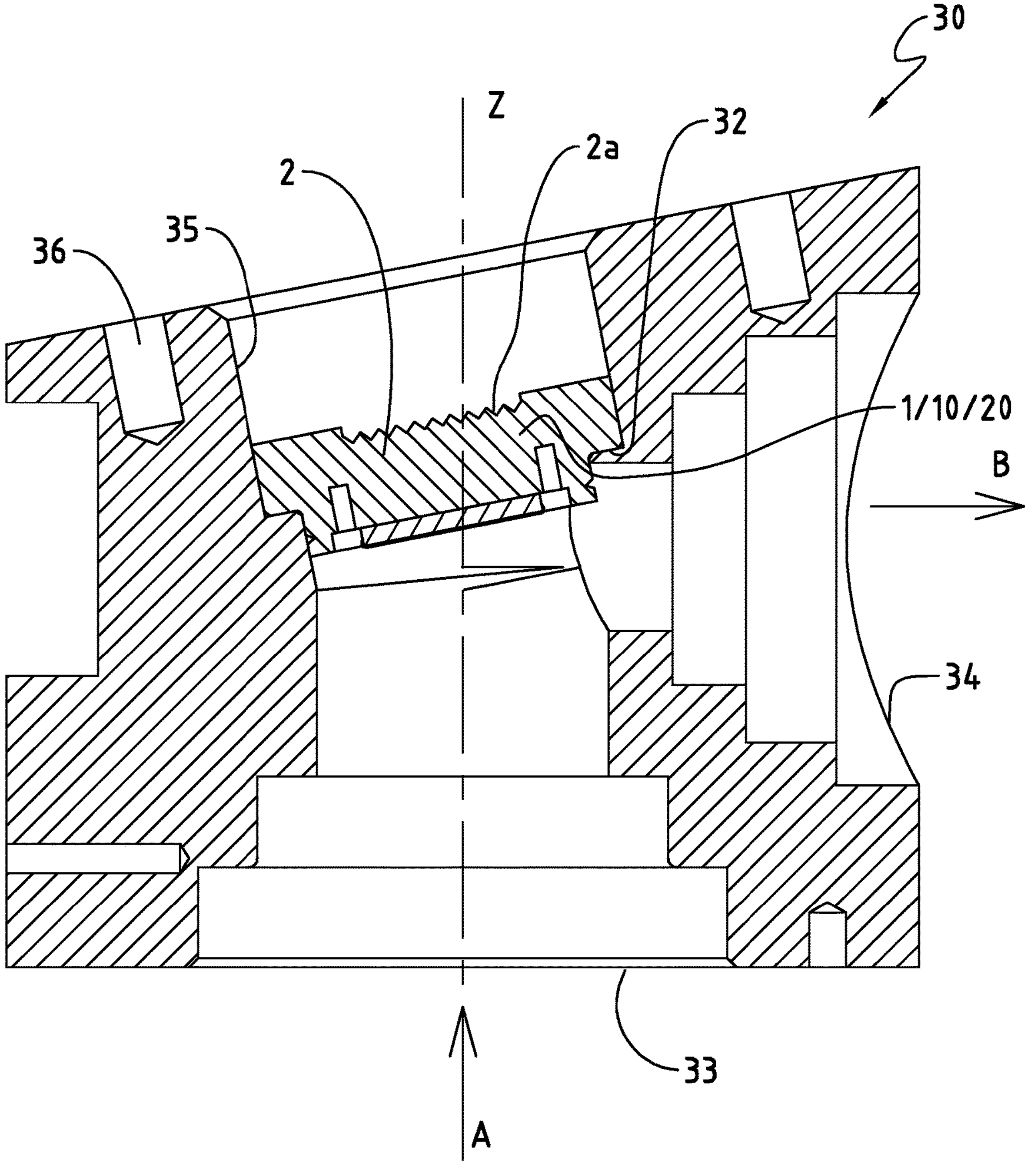
FIG. 5 is a sectional side view of an X-ray anode assembly according to a preferred embodiment of this aspect of the present invention.

FIG. 5 displays a sectional side view of an anode assembly 30 according to a preferred embodiment of this aspect of the present invention. The anode assembly 30 comprises an anode body 31 with a target socket 32 configured to receive the target assembly 1. The anode body 31 comprises an electron opening 33 through which electrons are entering the anode assembly 30 and an X-ray opening 34 through which X-ray produced at the target assembly 1, 10, 20 are exiting the anode assembly 30. As illustrated in this figure, the target assembly is tilted with respect to the longitudinal axis Z of the anode body 31. With this, it is possible to provide for an angle of approximately 90° between the electron impinging direction A and the X-ray emitting direction B. The anode body 31 further comprises a cooling opening 35 configured for the coupling of the target assembly with active cooling means (not shown here). For this purpose, attachment recess 36 such as threaded holes are provided in the anode body 31.

Finally, it should be pointed out that the foregoing has outlined pertinent non-limiting embodiments. It will be clear to those skilled in the art that modifications to the disclosed non-limiting embodiments can be carried out without departing from the spirit and scope thereof. As such, the described non-limiting embodiments ought to be considered merely illustrative of some of the more prominent features and applications. Other beneficial results can be realized by applying the non-limiting embodiments in a different manner or modifying them in ways known to those familiar with the art.

The invention claimed is:

1. X-ray target assembly comprising a base, and a multilayered X-ray target that comprises at least a heat transfer layer, an X-ray source layer and an adhesion layer provided between the heat transfer layer and the X-ray source layer, wherein the X-ray target is oriented such that the heat transfer layer is closest to the base, wherein the X-ray target is placed on top of a carrying element, wherein the in-plane coefficient of thermal expansion of each of the heat transfer layer, the X-ray source layer, the adhesion layer and of the material of the carrying element is different, wherein the in-plane coefficient of thermal expansion of the material of the carrying element the highest, wherein the carrying element featuring a height DH and a diameter DD is attached to the base and positioned between the base and the heat transfer layer, wherein the diameter DD of the carrying element is smaller than a diameter BD of the base, wherein the ratio R of the height DH over the diameter DD of the carrying element is larger than or equal to 0.1 and smaller than or equal to 0.2, and wherein a diameter TD of the X-ray target is substantially equal to the diameter DD of the carrying element.

2. X-ray target assembly according to claim 1, wherein the base and the carrying element are coaxial.

3. X-ray target assembly according to claim 1, wherein the diameter BD of the base is at least 1.5 time larger than the diameter DD of the carrying element.

4. X-ray target assembly according to claim 1, wherein the base and the carrying element are made out of copper or silver or a combination thereof.

5. X-ray target assembly according to claim 1, wherein the heat transfer layer exhibits an in-plane thermal conductivity of at least 500 W/m·K.

6. X-ray target assembly according to claim 5, wherein the heat transfer layer (4*a*) is made out of diamond.

7. X-ray target assembly according to claim 1, wherein the X-ray source layer is made out of tungsten, rhenium, molybdenum or an alloy thereof.

8. X-ray target assembly according to claim 1, wherein the X-ray target (14) comprises several heat transfer layers and X-ray source layers in alternation.

9. X-ray target assembly according to claim 8, wherein an adhesion layer is present between each heat transfer layer and X-ray source layer.

10. X-ray target assembly according to claim 1, wherein the one or more adhesion layer is made out rhenium, rhodium, molybdenum or chromium.

11. X-ray target assembly according to claim 1, wherein the X-ray source layer and/or the adhesion layer is deposited on the heat transfer layer by means of ion beam sputtering, chemically vapor deposition or thermally vapor deposition.

12. X-ray target assembly according to claim 1, wherein the base comprises cooling fins on its side opposite to the carrying element.

13. X-ray target assembly according to claim 1, wherein the base comprises a recess in which the carrying element is located.

14. X-ray target assembly according to claim 13, wherein the recess of the base possesses a depth smaller than half of the height DH of the carrying element.

15. X-ray anode assembly comprising an X-ray target assembly according to claim 1.

16. X-ray anode assembly according to claim 15, wherein it comprised a body with a target socket configured to receive the X-ray target assembly.

17. X-ray anode assembly according to claim 16, wherein the socket is configured such that the X-ray source layer of the target assembly is tilted with respect to the longitudinal axis of the anode body.

18. X-ray tube apparatus comprising an X-ray target assembly according to claim 1.

19. X-ray target assembly comprising a base, and a multilayered X-ray target that comprises at least a heat transfer layer, an X-ray source layer and an adhesion layer provided between the heat transfer layer and the X-ray source layer, wherein the X-ray target is oriented such that the heat transfer layer is closest to the base, wherein the X-ray target is placed on top of a carrying element, wherein the in-plane coefficient of thermal expansion of each of the heat transfer layer, the X-ray source layer, the adhesion layer and of the material of the carrying element is different, wherein the in-plane coefficient of thermal expansion of the material of the carrying element the highest, wherein the carrying element featuring a height DH and a diameter DD is attached to the base and positioned between the base and the heat transfer layer, wherein the diameter DD of the carrying element is smaller than a diameter BD of the base, and wherein a diameter TD of the X-ray target is substantially equal to the diameter DD of the carrying element.

* * * * *